(12) United States Patent
Kita et al.

(10) Patent No.: US 10,795,374 B2
(45) Date of Patent: Oct. 6, 2020

(54) VEHICLE CONTROL DEVICE

(71) Applicant: HONDA MOTOR CO., LTD., Minato-ku, Tokyo (JP)

(72) Inventors: Masakazu Kita, Wako (JP); Fumio Hamano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/935,118

(22) Filed: Mar. 26, 2018

(65) Prior Publication Data
US 2018/0284798 A1  Oct. 4, 2018

(30) Foreign Application Priority Data
Mar. 31, 2017  (JP) ................ 2017-071762

(51) Int. Cl.
| | | |
|---|---|---|
| *G05D 1/02* | (2020.01) | |
| *B60W 30/12* | (2020.01) | |
| *B62D 15/02* | (2006.01) | |
| *G06K 9/00* | (2006.01) | |
| *G06K 9/46* | (2006.01) | |
| *G06K 9/32* | (2006.01) | |
| *G05D 1/00* | (2006.01) | |

(52) U.S. Cl.
CPC ........... *G05D 1/0234* (2013.01); *B60W 30/12* (2013.01); *B62D 15/025* (2013.01); *G05D 1/0088* (2013.01); *G06K 9/00798* (2013.01); *G06K 9/4638* (2013.01); *G05D 2201/0213* (2013.01)

(58) Field of Classification Search
USPC .......................................................... 701/28
See application file for complete search history.

(56) References Cited

U.S. PATENT DOCUMENTS

| | | | |
|---|---|---|---|
| 6,829,388 B1 | 12/2004 | Sakurai | |
| 2016/0171315 A1* | 6/2016 | Yi ...................... | G06K 9/00791 |
| | | | 382/154 |
| 2016/0304097 A1* | 10/2016 | Taira .................. | G06K 9/00791 |
| 2017/0008521 A1* | 1/2017 | Braunstein ......... | G01C 21/3407 |
| 2018/0157269 A1* | 6/2018 | Prasad ............... | G06K 9/00798 |

FOREIGN PATENT DOCUMENTS

JP    2001-76147    3/2001

* cited by examiner

*Primary Examiner* — Lail A Kleinman
*Assistant Examiner* — Mahmoud M Kazimi
(74) *Attorney, Agent, or Firm* — Amin, Turocy & Watson, LLP

(57) ABSTRACT

A vehicle control device includes a peripheral image acquisition unit adapted to acquire peripheral image data including a lane marking on a road in a travel direction of a host vehicle, a lane marking recognition unit adapted to recognize the lane marking from the image data, and a specified region determining unit adapted to determine, within the image data, the presence or absence of a specified region where continuity of the road is interrupted. In the case that the specified region exists, the lane marking recognition unit performs recognition of the lane marking on a side closer to the host vehicle than the specified region.

8 Claims, 13 Drawing Sheets

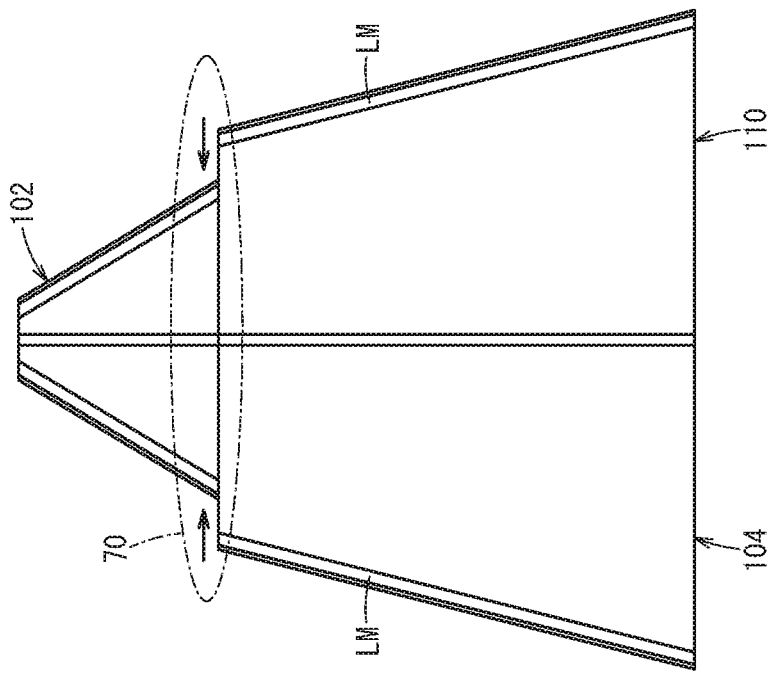
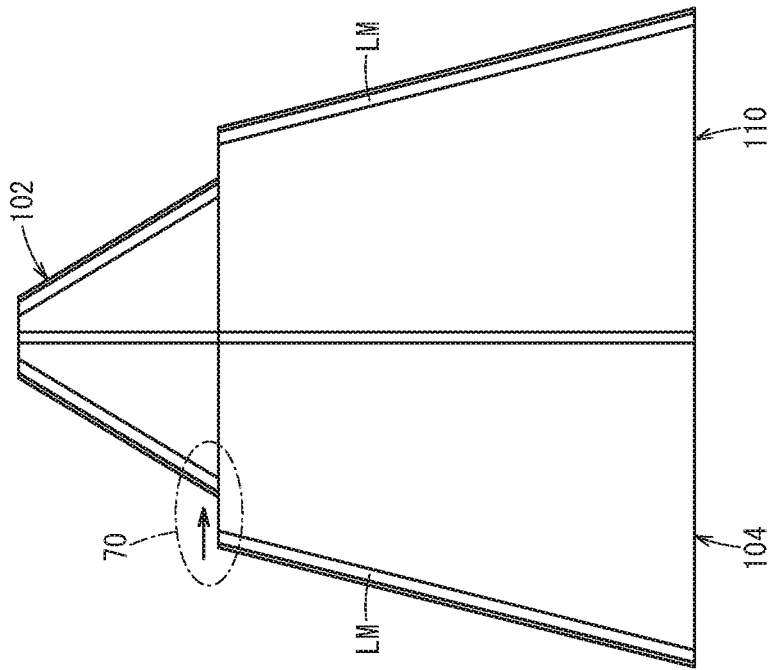

VEHICLE CONTROL DEVICE

CROSS-REFERENCE TO RELATED APPLICATION

This application is based upon and claims the benefit of priority from Japanese Patent Application No. 2017-071762 filed on Mar. 31, 2017, the contents of which are incorporated herein by reference.

BACKGROUND OF THE INVENTION

Field of the Invention

The present invention relates to a vehicle control device which at least partially automatically carries out a travel control for a host vehicle.

Description of the Related Art

Japanese Laid-Open Patent Publication No. 2001-076147 has an object of robustly and efficiently detecting white lines in an upper region of a road image, by dividing the road image into at least two regions vertically, and utilizing a white line detection result in a lower region where the influence of noise is minimal.

In order to achieve the aforementioned object, according to Japanese Laid-Open Patent Publication No. 2001-076147, in the case that the road surface is planar, an intersecting point of approximately straight left and right white lines within the lower region, which was obtained by dividing the road image including the left and right white lines drawn in parallel on the road surface into upper and lower regions, and an intersecting point of the approximately straight left and right white lines in the upper region, are both positioned on a single horizontal line. Thus, in the lower region, first left and right straight lines that approximate the left and right white lines are detected, and a horizontal line is calculated from a first vanishing point which is the intersection point of the first left and right straight lines. Then, using the fact that, in the upper region, the intersecting point of the left and right straight lines that approximate the left and right white lines exists on the horizontal line, the intersecting point is detected, and left and right white line approximating straight lines are determined in the upper region.

SUMMARY OF THE INVENTION

The road white line detection system disclosed in Japanese Laid-Open Patent Publication No. 2001-076147 is a technique in which lane markings are detected by dividing a region of interest (ROI) within image data captured by a camera. However, the main object of this technique is as a countermeasure against image noise.

Therefore, there is a concern that the following situations, for example, cannot be dealt with properly. More specifically, for a case in which the shape of the road is a repetition of uphill and downhill slopes, as shown in FIG. 13A, within the captured image data, an image is rendered in which continuity of the road 200 is interrupted. For a case in which the vehicle is traveling in the left lane 202 (refer to the two-dot dashed line 204), a discontinuous portion 206 is generated at least insofar as the left side lane marking LMa is concerned. In such a case, if the lane marking is detected, for example, on the left side of the travel lane 202, as shown in FIG. 13B, the lane marking LMa is connected at the discontinuous portion 206, and the road shape is recognized as if the width of the road 200 were decreasing.

In the foregoing manner, according to the conventional system, in the case that a discontinuous portion 206 is generated in relation to the lane marking LMa within the image data, the lane marking LMa is simply connected as it is. As a result, there is a concern that the actual road shape (for example, a shape in which there is a repetition of uphill and downhill slopes) may be mistakenly recognized as a different curving shape, or as a crank shape.

The present invention has been devised in order to solve the aforementioned problem, and has the object of providing a vehicle control device in which it is possible to perform a search for lane markings without erroneously recognizing the actual shape of the road, even if the continuity of the lane markings within the image data is interrupted.

[1] A vehicle control device according to the present invention is characterized by a vehicle control device configured to carry out a travel control for a host vehicle at least partially automatically, including a peripheral image acquisition unit configured to acquire peripheral image data including a lane marking on a road in a travel direction of the host vehicle, a lane marking recognition unit configured to recognize the lane marking from the image data, and a specified region determining unit configured to determine, within the image data, the presence or absence of a specified region where continuity of the road is interrupted, wherein, in the case that the specified region exists, the lane marking recognition unit performs recognition of the lane marking on a side closer to the host vehicle than the specified region.

For example, for a case in which the shape of the road is a repetition of uphill and downhill slopes, then when the road is captured by a camera, an image is rendered in which continuity of the road is interrupted. In this case, although it may be considered to mechanically connect the portions where the continuity of the road is interrupted, there is a concern that lane mark searching will be implemented with respect to a shape that differs from the actual road shape, for example, a curving or a crank-shaped road. Thus, according to the present invention, recognition of the lane marking (lane mark searching) is carried out on a side closer to the host vehicle than the region (specified region) in which continuity of the road is interrupted, and therefore, even if the continuity of the lane marking within the image data is interrupted, it is possible to perform lane mark searching without erroneously recognizing the actual shape of the road. This leads to an enhancement in the merchantability of vehicles that carry out a travel control for the vehicle at least partially automatically.

[2] In the present invention, the specified region determining unit may determine as the specified region a region within the image data in which a line indicating interruption of continuity of the road extends from the travel lane of the host vehicle to a lane in which an oncoming vehicle travels.

For example, in the case that the shape of a road is a repetition of uphill and downhill slopes, continuity of the road is discontinued not only for the lane (host vehicle lane) in which the host vehicle travels, but also for the lane (oncoming lane) in which oncoming vehicles travel. Accordingly, within the image data, by determining as the specified region a region in which a line indicating interruption of continuity of the road extends from the host vehicle lane to the oncoming lane, it is possible to easily and swiftly determine which region is the specified region.

[3] In the present invention, the specified region determining unit may determine as the specified region a region within the image data in which the lane marking of the travel lane of the host vehicle is shifted in a lateral direction midway therealong.

For example, in the case that the shape of the road is a repetition of uphill and downhill slopes, the lane marking of the host vehicle lane becomes shifted in a lateral direction midway therealong at the portion where the continuity of the road is interrupted. Accordingly, within the image data, by determining as the specified region a region in which the lane marking of the host vehicle lane is shifted in a lateral direction midway therealong, it is possible to easily and swiftly determine which region is the specified region.

[4] In the present invention, the specified region determining unit may determine as the specified region a region within the image data in which the lane marking of the travel lane of the host vehicle, and the lane marking of the lane in which an oncoming vehicle travels are both shifted in a lateral direction midway therealong.

For example, in the case that the shape of the road is a repetition of uphill and downhill slopes, the lane marking of the oncoming lane also becomes shifted in a lateral direction midway therealong at the portion where the continuity of the road is interrupted. Accordingly, within the image data, by determining as the specified region a region in which the lane marking of the host vehicle lane, and the lane marking of the oncoming lane are both shifted in a lateral direction midway therealong, it is possible to easily, swiftly and reliably determine which region is the specified region.

[5] In the present invention, the specified region determining unit may determine as the specified region a region within the image data in which a continuity of the road width of the travel lane of the host vehicle with respect to a depth direction is interrupted.

For example, in the case that the shape of the road is a repetition of uphill and downhill slopes, the continuity of the road width with respect to the depth direction of the host vehicle lane becomes interrupted at the portion where the continuity of the road is interrupted. Accordingly, within the image data, by determining as the specified region a region in which continuity of the road width of the host vehicle lane with respect to the depth direction is interrupted, it is possible to easily and swiftly determine which region is the specified region.

[6] In the present invention, within the image data, a plurality of rectangular markings that make up a dashed-line shaped lane marking may be included in the travel lane of the host vehicle, and the specified region determining unit may determine as the specified region a region in which continuity of a length of the plurality of rectangular markings with respect to a depth direction is interrupted.

On the road, as lane markings, there exist a continuous band shaped lane marking (white line), as well as a dashed-line shaped lane marking. To make up such a dashed-line shaped lane marking, a plurality of rectangular markings are drawn along the road.

In addition, in the case that the shape of the road is a repetition of uphill and downhill slopes, the continuity of the length of the plurality of rectangular markings with respect to a depth direction becomes interrupted at the portion where the continuity of the road is interrupted. Accordingly, within the image data, by determining as the specified region a region in which continuity of the length with respect to the depth direction of the plurality of rectangular markings is interrupted, it is possible to easily and swiftly determine which region is the specified region.

In accordance with the vehicle control device according to the present invention, it is possible to perform a lane marking search without erroneously recognizing the actual shape of the road, even if the continuity of the lane markings within the image data is interrupted.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is an explanatory diagram showing an example of a state in which, within the image data, at the portion where the continuity of the road is interrupted, a lane marking on an outer side of the host vehicle lane is shifted toward the side of a travel lane (oncoming lane) of an oncoming vehicle;

FIG. 4B is an explanatory diagram showing an example of a state in which, within the image data, the lane marking on the outer side of the host vehicle lane, and the lane marking on the outer side of the oncoming lane are both shifted in the lateral direction;

DESCRIPTION OF THE PREFERRED EMBODIMENTS

An exemplary embodiment of a vehicle control device according to the present invention will be presented and described in detail below with reference to FIGS. 1 through 12.

Figure 1:
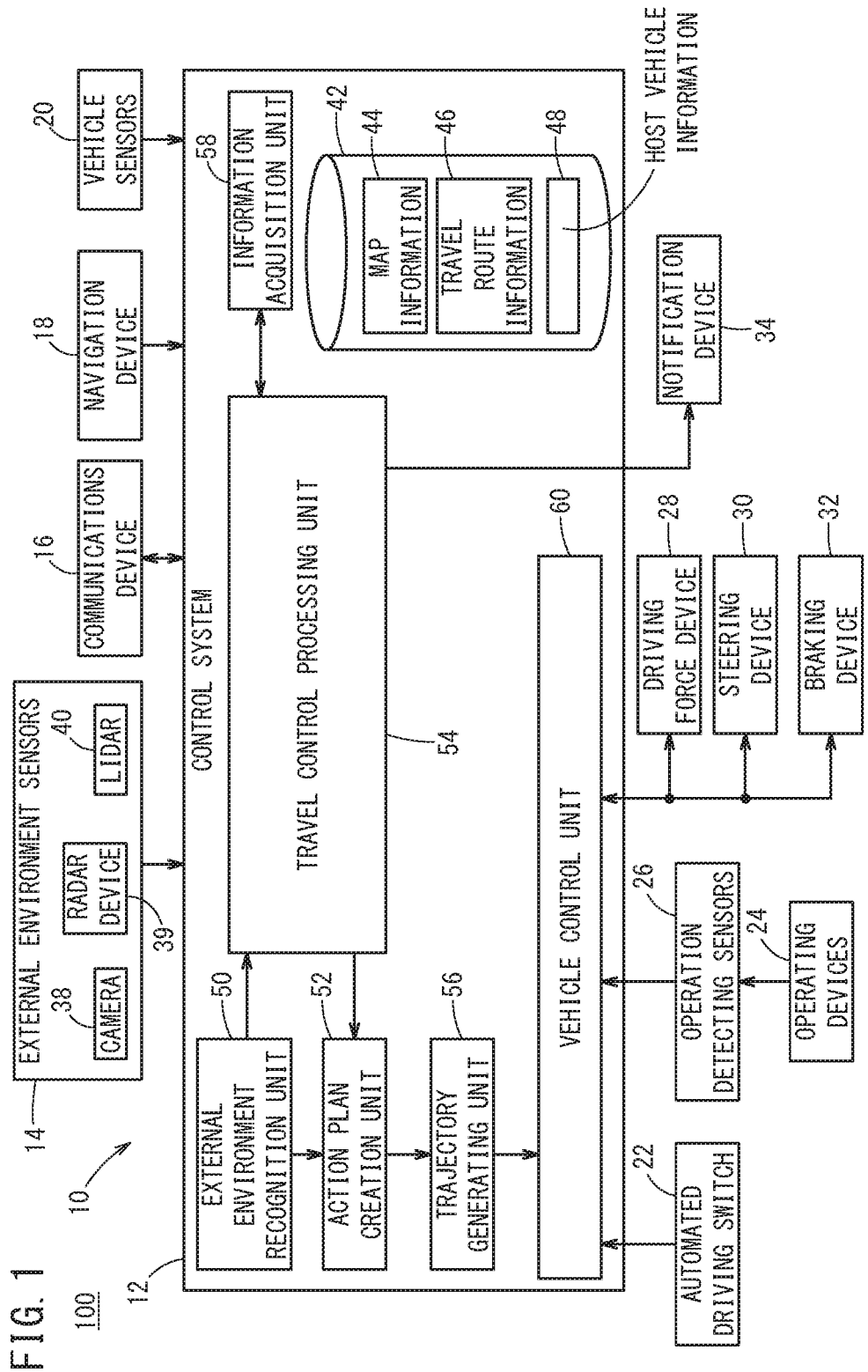
FIG. 1 is a block diagram showing the configuration of a vehicle control device according to an embodiment of the present invention.

FIG. 1 is a block diagram showing a configuration of a vehicle control device 10 according to an embodiment of the present invention. The vehicle control device 10 is incorporated in a driver's own vehicle 100 (referred to as a "host vehicle", see FIG. 3) and performs a travel control for the vehicle by way of automated driving or manual driving. In this case, the term "automated driving" implies a concept that includes not only "fully automated driving" in which the travel control for the vehicle is performed entirely automatically, but also "partial automated driving" in which the travel control is partially performed automatically.

As shown in FIG. 1, the vehicle control device 10 is basically made up from an input system device group, a control system 12, and an output system device group. The respective devices of the input system device group and the output system device group are connected via communication lines to the control system 12.

The input system device group includes external environment sensors 14, a communications device 16, a navigation device 18, vehicle sensors 20, an automated driving switch 22, and operation detecting sensors 26 connected to operating devices 24.

The output system device group includes a driving force device 28 for driving the vehicle wheels (not shown), a steering device 30 for steering the vehicle wheels, a braking device 32 for braking the vehicle wheels, and a notification device 34 for notifying the driver primarily through visual and auditory sensation.

The external environment sensors 14 acquire information (hereinafter referred to as external environmental information) indicative of the state of the external environment around the vehicle, and output the acquired external environmental information to the control system 12. More specifically, the external environment sensors 14 are configured to include a plurality of cameras 38, a plurality of radar devices 39, and a plurality of LIDAR devices 40 (Light Detection and Ranging; Laser Imaging Detection and Ranging).

The communications device 16 is configured to be capable of communicating with external devices including roadside devices, other vehicles, and a server, and transmits and receives, for example, information related to transportation facilities, information related to other vehicles, probe information (including traffic congestion information), and most recent map information 44, etc. The map information 44 is stored in a predetermined memory area of a storage device 42, or alternatively, in the navigation device 18.

The navigation device 18 is constituted to include a satellite positioning device, which is capable of detecting a current position of the vehicle, and a user interface (for example, a touch-panel display, a speaker, and a microphone). Based on the current position of the vehicle or a position designated by the user, while traveling in a given lane, the navigation device 18 calculates a route to a designated destination point or a route along roadways, and outputs the route to the control system 12. The route calculated by the navigation device 18 is stored as planned travel route information 46 in a predetermined memory area of the storage device 42.

The vehicle sensors 20 output to the control system 12 detection signals from respective sensors, including a speed sensor for detecting the travel speed V (vehicle velocity), an acceleration sensor for detecting an acceleration, a lateral G sensor for detecting a lateral G force, a yaw rate sensor for detecting an angular velocity about a vertical axis, an orientation sensor for detecting an orientation, and a gradient sensor for detecting a gradient of the vehicle. The detection signals are stored as host vehicle information 48 in a predetermined memory area of the storage device 42.

The automated driving switch 22, for example, is a pushbutton switch provided on the instrument panel. The automated driving switch 22 is configured to be capable of switching between a plurality of driving modes, by manual operation thereof by a user including the driver.

The operating devices 24 include an accelerator pedal, a steering wheel, a brake pedal, a shift lever, and a direction indication (turn signal) lever. The operation detecting sensors 26, which detect the presence or absence or the operated amounts of operations made by the driver, as well as operated positions, are attached to the operating devices 24.

The operation detecting sensors 26 output to a vehicle control unit 60 as detection results an amount by which the accelerator pedal is depressed (degree of accelerator opening), an amount (steering amount) by which the steering wheel is operated, an amount by which the brake pedal is depressed, a shift position, and a right or left turn direction, etc.

The driving force device 28 is constituted from a driving force ECU (Electronic Control Unit), and a drive source including an engine and/or a driving motor. The driving force device 28 generates a travel driving force (torque) for the vehicle in accordance with vehicle control values input thereto from the vehicle control unit 60, and transmits the travel driving force to the vehicle wheels directly or through a transmission.

The steering device 30 is constituted from an EPS (electric power steering system) ECU, and an EPS device. The steering device 30 changes the orientation of the wheels (steered wheels) in accordance with vehicle control values input thereto from the vehicle control unit 60.

The braking device 32, for example, is an electric servo brake used in combination with a hydraulic brake, and is made up from a brake ECU and a brake actuator. The braking device 32 brakes the vehicle wheels in accordance with vehicle control values input thereto from the vehicle control unit 60.

The notification device 34 is made up from a notification ECU, a display device, and an audio device. The notification device 34 performs a notifying operation in relation to automated driving or manual driving, in accordance with a notification command output from the control system 12 (and more specifically, a travel control processing unit 54 thereof).

In this instance, an "automated driving mode" and a "manual driving mode" (non-automated driving mode) are switched sequentially each time that the automated driving switch 22 is pressed. Instead of this feature, in order to provide confirmation of a driver's intention, it is possible to provide settings in which, for example, switching from the manual driving mode to the automated driving mode is effected by pressing twice, and switching from the automated driving mode to the manual driving mode is effected by pressing once.

The automated driving mode is a driving mode in which the vehicle travels under the control of the control system 12, in a state in which the driver does not operate the operating devices 24 (specifically, at least one from among the accelerator pedal, the steering wheel, and the brake pedal). Stated otherwise, in the automated driving mode, the control system 12 controls a portion or all of the driving force device 28, the steering device 30, and the braking device 32 in accordance with sequentially created action plans.

When the driver performs a predetermined operation using the operating devices 24 during implementation of the automated driving mode, the automated driving mode is canceled automatically, together with switching to a driving mode (which may include the manual driving mode) in which the level of driving automation is relatively low. Hereinafter, an operation in which the driver operates the automated driving switch 22 or any of the operating devices 24 in order to transition from automated driving to manual driving may also be referred to as an "override operation".

The control system 12 is constituted by one or a plurality of ECUs, and comprises various function realizing units in addition to the aforementioned storage device 42. According to the present embodiment, the function realizing units are software-based functional units, in which the functions thereof are realized by a CPU (central processing unit) executing programs stored in the storage device 42. However, the functions thereof can also be realized by hardware-based functional units made up from integrated circuits such as a field-programmable gate array (FPGA) or the like.

In addition to the storage device 42 and the vehicle control unit 60, the control system 12 is configured to include an external environment recognition unit 50, an action plan creation unit 52, a travel control processing unit 54, a trajectory generating unit 56, and an information acquisition unit 58.

Using various information input thereto from the input system device group (for example, external environmental information from the external environment sensors 14), the external environment recognition unit 50 recognizes lane markings (white lines) on both sides of the vehicle, or dashed-line shaped lane markings indicating partitions within the lane, and generates "static" external environment recognition information, including location information of stop lines and traffic signals, or travel enabled regions in which traveling is possible. Further, using the various information input thereto, the external environment recognition unit 50 generates "dynamic" external environment recognition information, including information concerning obstacles such as parked or stopped vehicles, traffic participants such as people and other vehicles, and the colors of traffic signals.

On the basis of recognition results from the external environment recognition unit 50, the action plan creation unit 52 creates action plans (a time series of events), and updates the action plans as needed. As types of events, for example, there may be cited events in relation to deceleration, acceleration, branching, merging, lane keeping, lane changing, passing other vehicles, and a road departure mitigation control. In this instance, "deceleration" and "acceleration" are events in which the vehicle is made to decelerate or accelerate. "Branching" and "merging" are events in which the vehicle is made to travel smoothly at a branching point or a merging point. "Lane changing" is an event in which the travel lane of the vehicle is made to change. "Passing" is an event in which the vehicle is made to overtake a preceding vehicle.

Further, "lane keeping" is an event, for example, in which the host vehicle is made to travel while searching for lane markings on at least one side of the host vehicle lane, so as not to deviate from the lane (host vehicle lane) in which the host vehicle travels, and the event is subdivided based on a combination of travel modes. More specifically, as such travel modes, there may be included constant speed traveling, follow-on traveling, traveling while decelerating, traveling through a curve, or traveling to avoid obstacles. The "road departure mitigation control" recognizes the host vehicle lane with a monocular camera, prompts the attention of the driver by a display and a vibration applied to the steering wheel when the host vehicle is about to go outside of the host vehicle lane, and in the case that an avoidance operation is not being performed, provides an assist to control the steering and restore the host vehicle into the host vehicle lane. Further, if it is predicted that a large amount of lane deviation is likely to occur, braking is also controlled to suppress the deviation.

Using the map information 44, the planned travel route information 46, and the host vehicle information 48, which are read from the storage device 42, the trajectory generating unit 56 generates a travel trajectory (a time series of target behaviors) in accordance with the action plan created by the action plan creation unit 52. More specifically, the travel trajectory is a time-series data set in which data units thereof are defined by at least position and velocity. Of course, the data units may further include at least one of a position, a posture angle, a velocity, an acceleration, a curvature, a yaw rate, and a steering angle.

The vehicle control unit 60 determines respective vehicle control values in order to control traveling of the vehicle, in accordance with the travel trajectory (time series of target behaviors) generated by the trajectory generating unit 56. In addition, the vehicle control unit 60 outputs the obtained vehicle control values, respectively, to the driving force device 28, the steering device 30, and the braking device 32.

The information acquisition unit 58 acquires information necessary for the process of determining conditions (hereinafter referred to as environmental conditions) in relation to the travel environment of the vehicle. As detailed examples of such necessary information, there may be cited time information (for example, the current time, the time zone, an expected arrival time), geographic information (for example, latitude, longitude, altitude, topography, differences in elevation), and weather information (for example, the weather, temperature, humidity, forecast information).

On the other hand, the travel control processing unit 54 performs a process of transitioning between driving modes, and outputs signals to the action plan creation unit 52 and the notification device 34. More specifically, as shown in FIG. 2, the travel control processing unit 54 includes as functions thereof a travel environment acquisition unit 62, a peripheral image acquisition unit 64, a specified region determining unit 66 (a first specified region determining unit 66A through a fifth specified region determining unit 66E), and a lane marking recognition unit 68.

Figure 2:
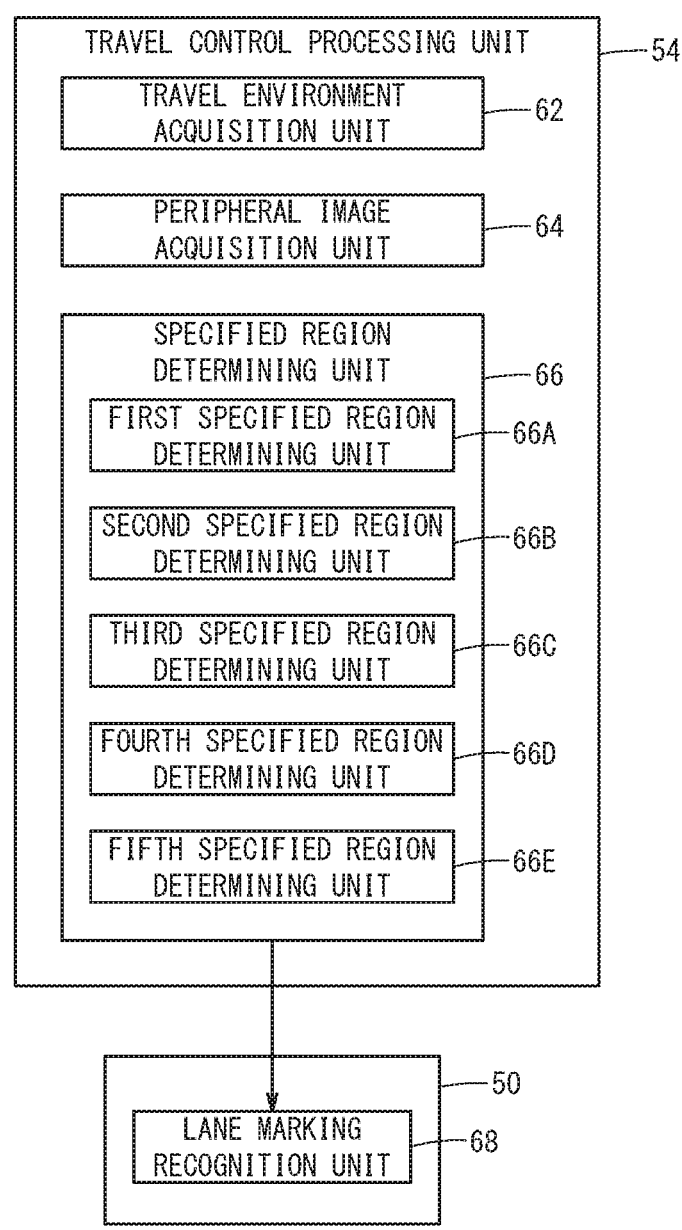
FIG. 2 is a block diagram showing a travel control processing unit.

In FIG. 2, the first specified region determining unit 66A through the fifth specified region determining unit 66E are shown as respective functions of the specified region determining unit 66. In this case, it is not necessary to include all of the first specified region determining unit 66A through the fifth specified region determining unit 66E, and depending on the vehicle model and specifications or the like, at least one from among the first specified region determining unit 66A through the fifth specified region determining unit 66E may be included.

The travel environment acquisition unit 62 acquires information concerning the travel environment of the host vehicle 100. Within the travel environment, there are included the most recent recognition results by the external environment recognition unit 50, or acquired information (for example, the aforementioned time information, geographical information, and weather information) from the information acquisition unit 58.

The peripheral image acquisition unit 64 acquires peripheral image data including a lane marking on the road in the direction of travel of the host vehicle 100. As lane markings, the following different types of lane markings can be cited:

(a) Assuming that the lane in which the host vehicle is traveling (hereinafter referred to as a "host vehicle lane") is one lane, band shaped lane markings on left and right sides of the host vehicle lane;

(b) Assuming that the host vehicle lane includes multiple lanes therein, lane markings on left and right sides of the host vehicle lane, and a dashed-line shaped lane marking between such lane markings;

(c) Assuming that the lane in which another vehicle is traveling (hereinafter referred to as an "other vehicle lane") is one lane, band shaped lane markings on left and right sides of the other vehicle lane; and (d) Assuming that the other vehicle lane includes multiple lanes therein, lane markings on left and right sides of the other vehicle lane, and a dashed-line shaped lane marking between such lane markings.

The specified region determining unit 66 determines, within the image data, the presence or absence of a specified region in which continuity of the road is interrupted. This feature will be described later.

Utilizing various information (for example, external environmental information from the external environment sensors 14) included in the external environment recognition unit 50 and input by the input system device group, the lane marking recognition unit 68 searches for and recognizes a lane marking (white line, dashed line, etc.) on at least one side of the host vehicle.

In particular, according to the present embodiment, if it is determined by the specified region determining unit 66 that a specified region exists, recognition of the lane marking is carried out short of the specified region which was determined by the specified region determining unit 66 (i.e., on a side closer to the host vehicle than the specified region). In the case that the specified region does not exist, the lane marking is recognized within a preset region. Concerning the preset region, in order to incorporate a significant amount of forward information therein, a region is set which extends as far away as possible from the host vehicle 100, for example, a region from 300 to 500 meters away from the host vehicle 100 is set. In contrast thereto, as for the region on a side closer to the host vehicle than the specified region, for example, a region from 100 to 300 meters away from the host vehicle 100 is set.

Concerning the specified region determining unit 66, some specific examples thereof will now be described with reference to FIGS. 3 to 6.

Figure 3:
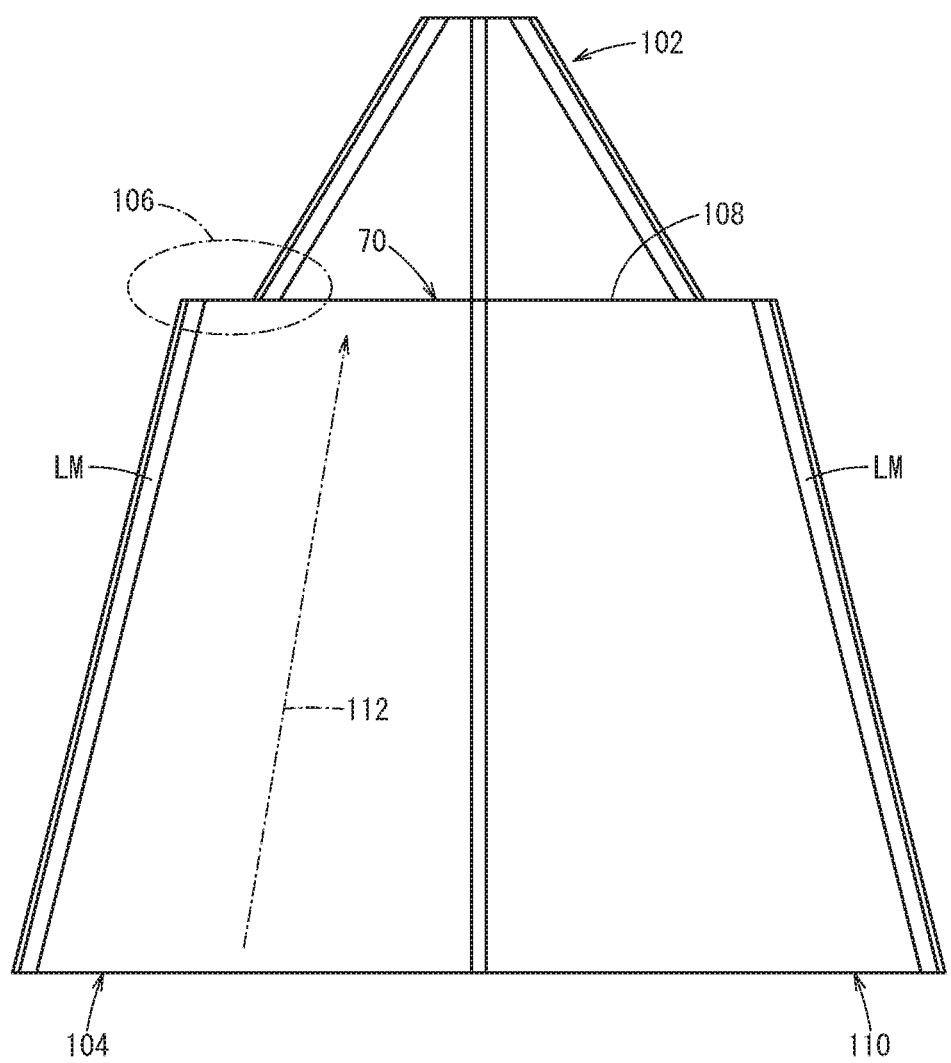
FIG. 3 is an explanatory diagram showing an example of a state in which, within image data, a discontinuous portion is generated in relation to a lane marking on an outer side of a travel lane (host vehicle lane) of a host vehicle.

First, for a case in which the shape of a road 102 is a repetition of uphill and downhill slopes, as shown in FIG. 3, within the captured image data, an image is rendered in which continuity of the road 102 is interrupted. Stated otherwise, a discontinuous portion 106 is generated in relation to the lane marking LM on the outer side of the lane (travel lane) in which the host vehicle 100 travels (hereinafter referred to as a "host vehicle lane 104"). In addition, within the image data, a line (referred to as a "boundary line 108") indicating interruption of continuity of the road 102 extends from the host vehicle lane 104 to a lane in which oncoming vehicles travel (hereinafter referred to as an "oncoming lane 110"). Moreover, a planned travel route 112 for the host vehicle 100 is indicated by the two-dot dashed line.

Thus, for example, as shown in FIG. 3, the first specified region determining unit 66A determines as the specified region 70 a region in which the aforementioned boundary line 108 extends from the host vehicle lane 104 to the oncoming lane 110, within the image data.

In addition, the lane marking recognition unit 68 performs recognition of the lane marking LM on a side closer to the host vehicle than the specified region 70 that was determined by the first specified region determining unit 66A.

Further, as shown in FIG. 4A, within the image data, at the portion where the continuity of the road 102 is interrupted, the lane marking LM on the outer side of the host vehicle lane 104 is shifted in a lateral direction, and in the example of FIG. 4A, is shifted toward the side of the oncoming lane 110. Assuming that the host vehicle lane 104 is traveling in the left lane, such shifting takes place toward the right side. This same feature holds true whether the host vehicle lane 104 involves one lane or multiple lanes.

Thus, the second specified region determining unit 66B determines as the specified region 70 a region within the image data in which the lane marking LM of the host vehicle lane 104 is shifted in a lateral direction midway therealong.

Further, as shown in FIG. 4B, within the image data, at the portion where the continuity of the road 102 is interrupted, the lane marking LM on the outer side of the host vehicle lane 104, and the lane marking LM on the outer side of the oncoming lane 110 are both shifted in the lateral direction. Assuming that the host vehicle lane 104 is the left lane, such shifting takes place toward the right side, and assuming that the oncoming lane 110 is the right lane, such shifting takes place toward the left side. This same feature holds true whether the host vehicle lane 104 and the oncoming lane 110 involve one lane or multiple lanes.

Thus, the third specified region determining unit 66C determines as the specified region 70 a region within the image data in which the lane marking LM of the host vehicle lane 104, and the lane marking LM of the oncoming lane 110 are both shifted in a lateral direction midway therealong.

Figure 5:
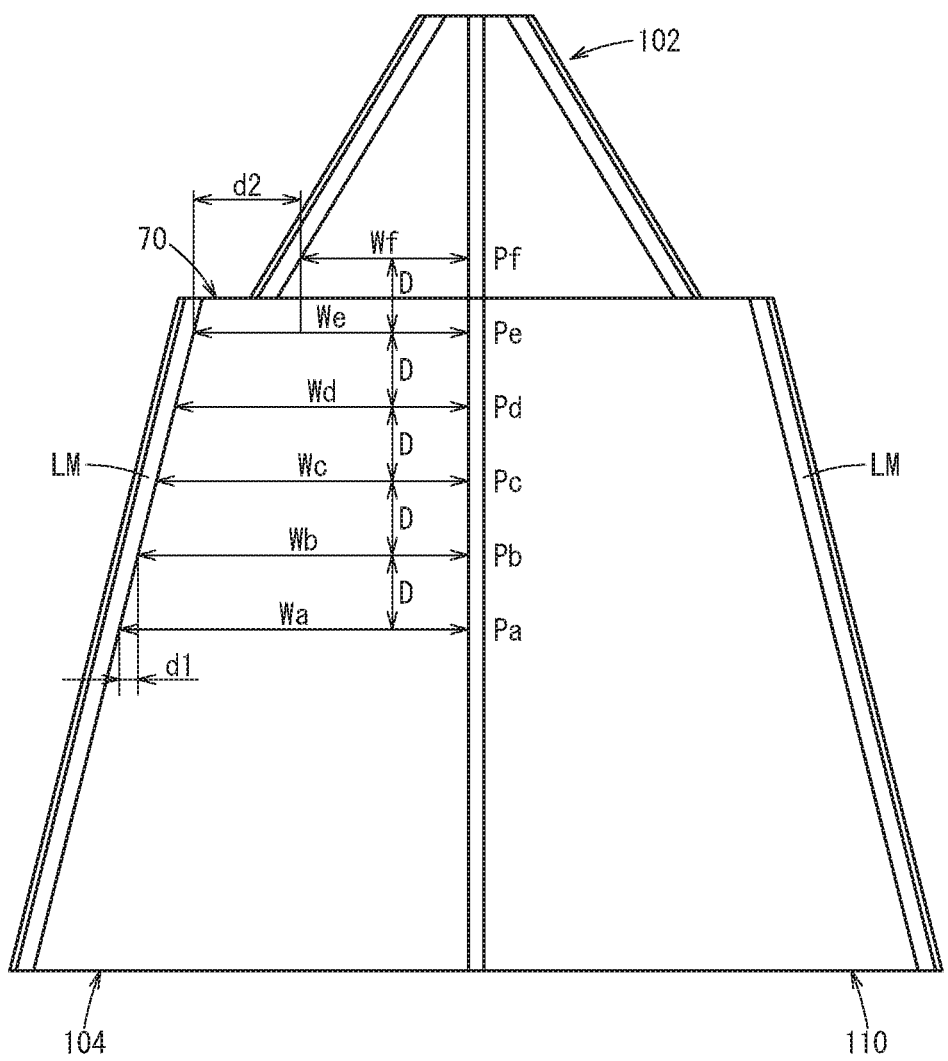
FIG. 5 is an explanatory diagram showing an example of a state in which, within the image data, at the portion where the continuity of the road is interrupted, the continuity of the road width with respect to the depth direction of the host vehicle lane is interrupted.

Further, as shown in FIG. 5, within the image data, at the portion where the continuity of the road 102 is interrupted, the continuity of the road width with respect to the depth direction of the host vehicle lane 104 is interrupted.

For example, within the host vehicle lane 104, in a region up to the portion where the continuity of the road 102 is interrupted, the road width of the host vehicle lane 104 becomes shorter by a constant interval for each advancement thereof (for each upward advancement thereof) by a unit distance in the depth direction. More specifically, in FIG. 5, with each advancement by a unit distance D in the depth direction from the point Pa, the points Pb, Pc, . . . , Pf are defined. Among these points, the points Pa to Pe are positioned on a side closer to the host vehicle than the portion where the continuity of the road 102 is interrupted, and the point Pf is positioned in a region that is farther from the host vehicle than the portion where the continuity of the road 102 is interrupted.

In addition, from point Pa to point Pe, the road widths Wa, Wb, Wc, Wd, We of the host vehicle lane 104 become shorter at a constant interval d1. Stated otherwise, within this region, continuity exists in the road width with respect to the depth direction. However, the difference d2 between the road width We at point Pe and the road width Wf at point Pf is greater than the aforementioned constant interval d1 (d2>d1). Stated otherwise, between point Pe and point Pf, the continuity of the road width with respect to the depth direction is interrupted.

Thus, the fourth specified region determining unit 66D determines as the specified region 70 a region within the image data in which a continuity of the road width with respect to the depth direction of the host vehicle lane 104 is interrupted.

Figure 6:
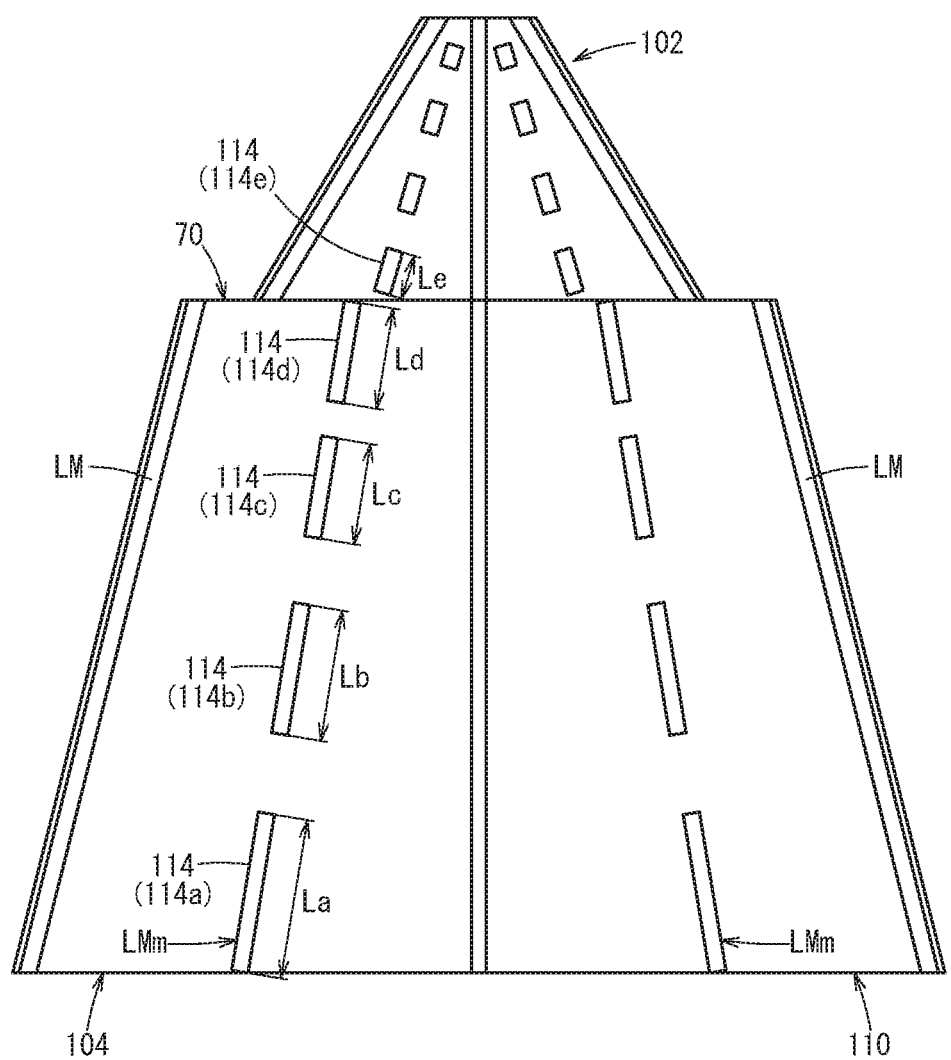
FIG. 6 is an explanatory diagram showing an example of a state in which, within the image data, at the portion where the continuity of the road is interrupted, the continuity of a length, with respect to a depth direction, of a plurality of rectangular markings of a dashed-line shaped lane marking is interrupted.

Further, as shown in FIG. 6, for example, if there are multiple lanes designed for one-way traffic, dashed-line shaped lane markings LMm are provided, which indicate partitions between each of the respective lanes. The dashed-line shaped lane markings LMm are constituted by arranging a plurality of rectangular markings 114 along the lanes. In addition, the continuity of the length with respect to the depth direction concerning the plurality of rectangular markings 114 becomes interrupted at the portion where the continuity of the road 102 is interrupted.

Within the image data, for example, within the host vehicle lane 104, in a region up to the portion where the continuity of the road 102 is interrupted, the length with respect to the depth direction concerning the rectangular markings 114 becomes shorter by a constant interval.

More specifically, in FIG. 6, within the image data, for example, in the host vehicle lane 104, the plurality of rectangular markings 114 are of a form in which the respective elongate axes thereof are arranged along the depth direction of the host vehicle lane 104. Among the rectangular markings 114, the rectangular markings 114*a* to 114*d* are positioned short of the portion where the continuity of the road 102 is interrupted (i.e., positioned on a side closer to the host vehicle than the portion), and the rectangular marking 114*e* is positioned in a region that is on the further side of the portion where the continuity of the road 102 is interrupted. In addition, the lengths La, Lb, Lc, Ld of the rectangular markings 114*a* to 114*d* become shorter by a constant interval. Stated otherwise, within this region, a continuity exists in the length of the rectangular markings 114 with respect to the depth direction. However, the difference between the length Ld of the rectangular marking 114*d* and the length Le of the rectangular marking 114*e* is greater than the aforementioned constant interval. Stated otherwise, between the rectangular marking 114*d* and the rectangular marking 114*e*, the continuity of the length with respect to the depth direction thereof is interrupted.

Thus, the fifth specified region determining unit 66E determines as the specified region 70 a region within the image data in which a continuity of the length of the plurality of rectangular markings 114 with respect to the depth direction is interrupted in the dashed-line shaped lane marking LMm.

Next, processing operations of the vehicle control device 10 according to the present embodiment will be described with reference to the flowcharts of FIGS. 7 to 12.

Figure 7:
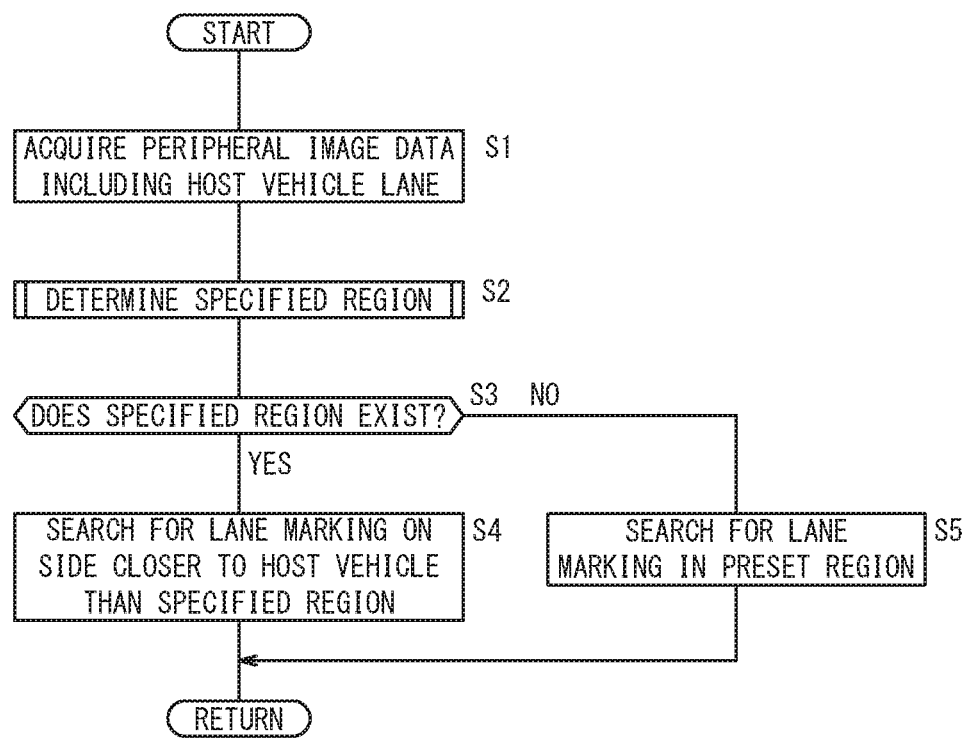
FIG. 7 is a flowchart showing processing operations of the vehicle control device according to the present embodiment.

First, in step S1 of FIG. 7, the peripheral image acquisition unit 64 acquires peripheral image data including the lane marking LM on the road in the direction of travel of the host vehicle 100.

In step S2, the specified region determining unit 66 initiates a process for determining the specified region. In this instance, processes for cases in which each one of the first specified region determining unit 66A through the fifth specified region determining unit 66E is adopted as the specified region determining unit 66 will be described with reference to FIGS. 8 to 12.

Figure 8:
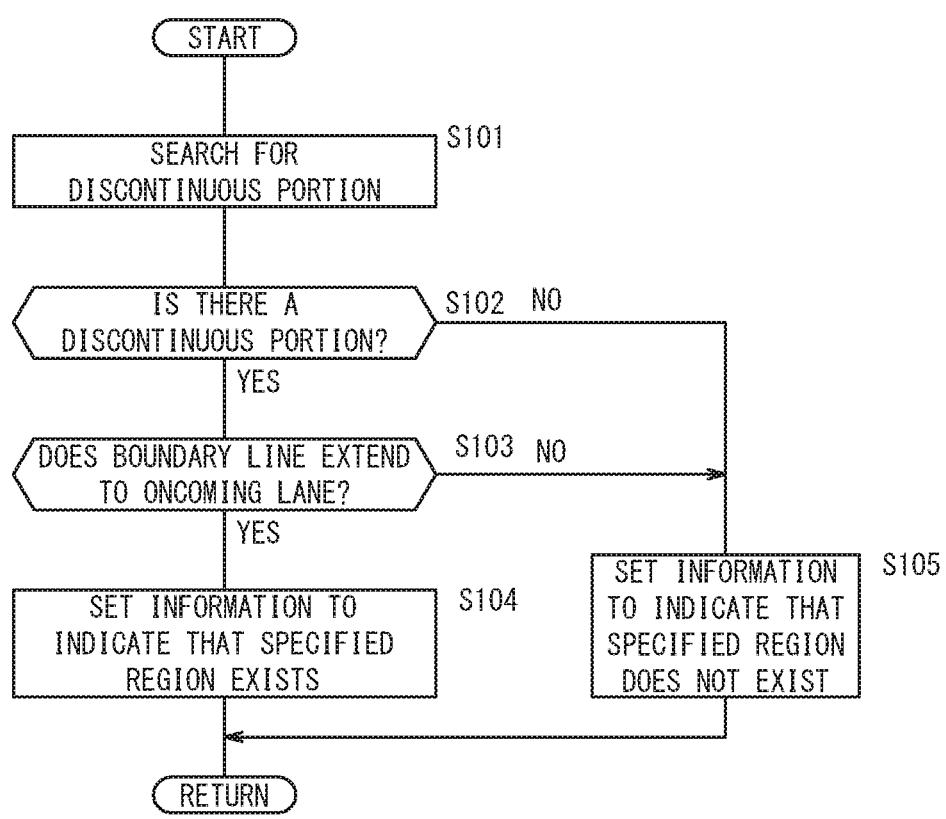
FIG. 8 is a flowchart showing processing operations of a first specified region determining unit.

First, in the case that the first specified region determining unit 66A is adopted as the specified region determining unit 66, the process proceeds to step S101 of FIG. 8. In step S101, searching is carried out as to whether or not a discontinuous portion 106 (see FIG. 3) exists within the image data in relation to the lane marking LM on the outer side of the host vehicle lane 104.

If as a result of the search, the discontinuous portion 106 exists (step S102: YES), the process proceeds to step S103, whereupon it is determined whether the boundary line 108 (see FIG. 3) of the discontinuous portion 106 extends from the host vehicle lane 104 to the oncoming lane 110. If the boundary line 108 extends in this manner (step S103: YES), the process proceeds to step S104, and information is set to indicate that the specified region 70 exists. Such settings may include, for example, setting a determination flag to "1", and setting information concerning the boundary line 108 within the image data (for example, setting coordinates of the boundary line 108 in the image memory), and the like. Setting of information concerning the boundary line 108 may include outputting the information concerning the boundary line 108 to the lane marking recognition unit 68, or storing the information concerning the boundary line 108 in a predetermined memory area, or the like.

On the other hand, in the case it is determined in the aforementioned step S102 that the discontinuous portion 106 does not exist (step S102: NO), or alternatively, in the case it is determined in step S103 that the boundary line 108 does not extend to the oncoming lane 110 (step S103: NO), the process proceeds to step S105, and information is set to indicate that the specified region 70 does not exist. Such settings may include, for example, resetting the determination flag to "0", or the like.

At a stage at which the process of step S104 or the process of step S105 is completed, the processing performed by the first specified region determining unit 66A is temporarily terminated.

Figure 9:
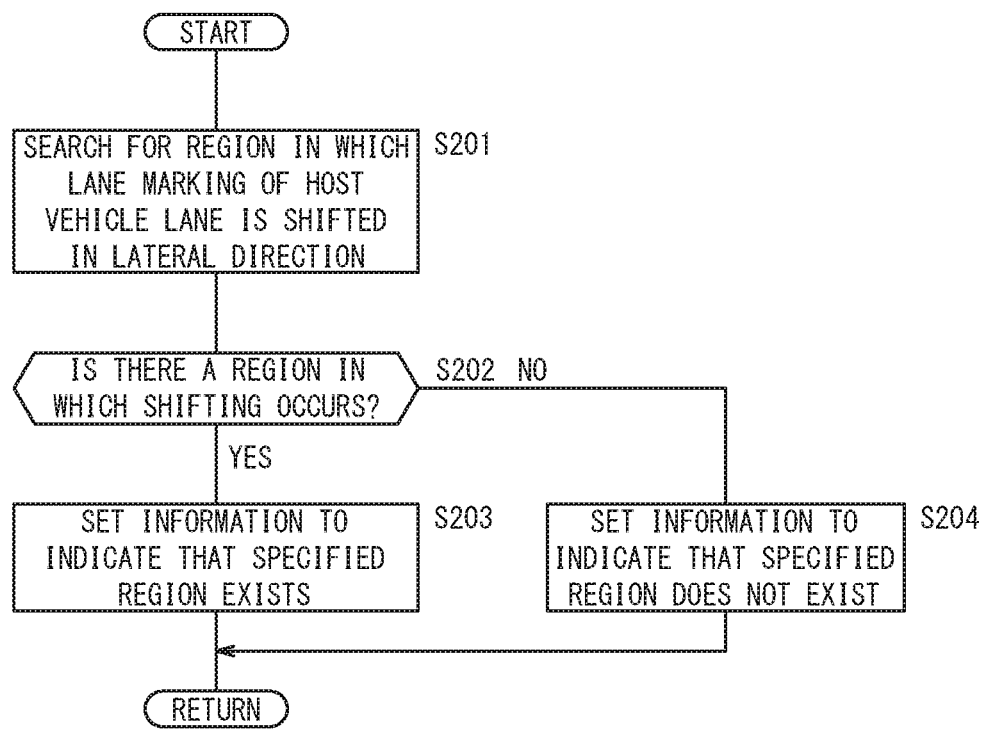
FIG. 9 is a flowchart showing processing operations of a second specified region determining unit.

Next, in the case that the second specified region determining unit 66B is adopted as the specified region determining unit 66, the process proceeds to step S201 of FIG. 9. In step S201, searching is carried out as to whether or not a region (specified region 70, refer to FIG. 4A) exists within the image data in which the lane marking LM of the host vehicle lane 104 is shifted in a lateral direction midway therealong.

If as a result of the search, a region exists in which the lane marking LM of the host vehicle lane 104 is shifted in the lateral direction (step S202: YES), the process proceeds to step S203, and information is set to indicate that the specified region 70 exists. Such settings may include, for example, setting a determination flag to "1", and setting information concerning the aforementioned region in which there is shifting in the lateral direction within the image data (for example, setting coordinates of the aforementioned region in the image memory), and the like. Setting of information concerning the aforementioned region in which there is shifting in the lateral direction may include outputting the information concerning the aforementioned region to the lane marking recognition unit 68, or storing the information concerning the aforementioned region in a predetermined memory area, or the like.

On the other hand, in the case it is determined in the aforementioned step S202 that a region in which there is shifting in the lateral direction does not exist (step S202: NO), the process proceeds to step S204, and information is set to indicate that the specified region 70 does not exist. Such settings may include, for example, resetting the determination flag to "0", or the like.

At a stage at which the process of step S203 or the process of step S204 is completed, the processing performed by the second specified region determining unit 66B is temporarily terminated.

Figure 10:
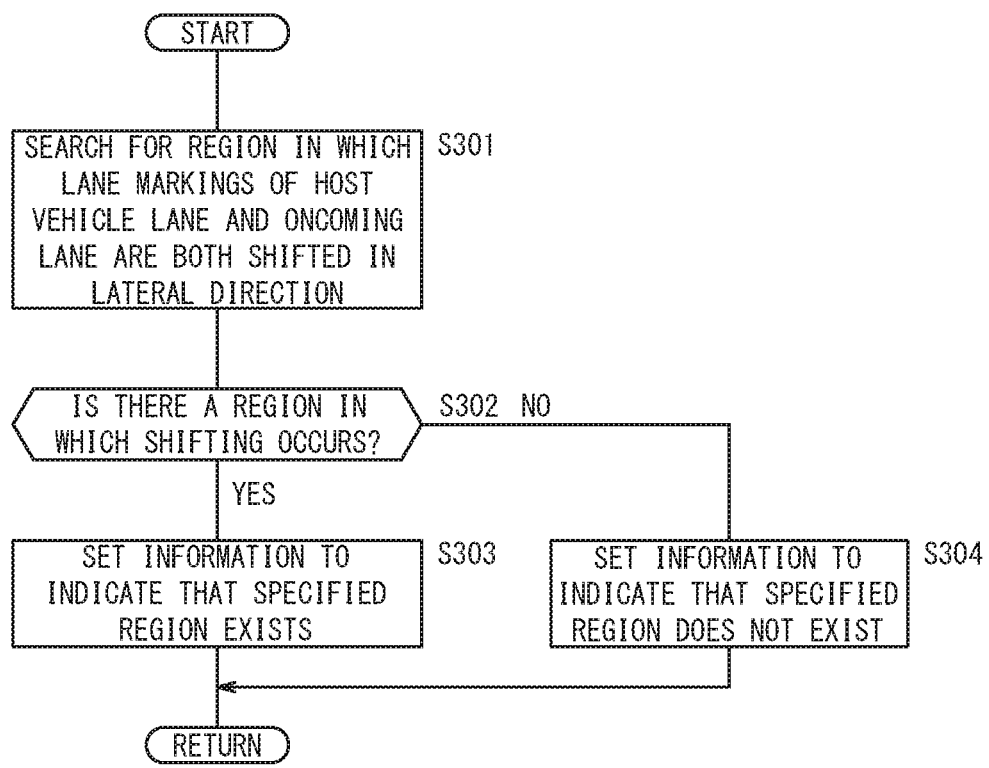
FIG. 10 is a flowchart showing processing operations of a third specified region determining unit.

Next, in the case that the third specified region determining unit 66C is adopted as the specified region determining unit 66, the process proceeds to step S301 of FIG. 10. In step S301, searching is carried out as to whether or not a region (specified region 70, refer to FIG. 4B) exists within the image data in which the lane marking LM of the host vehicle lane 104, and the lane marking LM of the oncoming lane 110 are both shifted in a lateral direction midway therealong.

If as a result of the search, a region exists in which the lane markings LM of the host vehicle lane 104 and the oncoming lane 110 are both shifted in the lateral direction (step S302: YES), the process proceeds to step S303, and information is set to indicate that the specified region 70 exists. Such settings may include, for example, setting a determination flag to "1", and setting information concerning the aforementioned region in which there is shifting of both lane markings in the lateral direction within the image data (for example, setting coordinates of the aforementioned region in the image memory), and the like. Setting of information concerning the aforementioned region in which there is shifting of both lane markings in the lateral direction may include outputting the information concerning the aforementioned region to the lane marking recognition unit 68, or storing the information concerning the aforementioned region in a predetermined memory area, or the like.

On the other hand, in the case it is determined in the aforementioned step S302 that a region in which there is shifting in the lateral direction does not exist (step S302: NO), the process proceeds to step S304, and information is set to indicate that the specified region 70 does not exist. Such settings may include, for example, resetting the determination flag to "0", or the like.

At a stage at which the process of step S303 or the process of step S304 is completed, the processing performed by the third specified region determining unit 66C is temporarily terminated.

Figure 11:
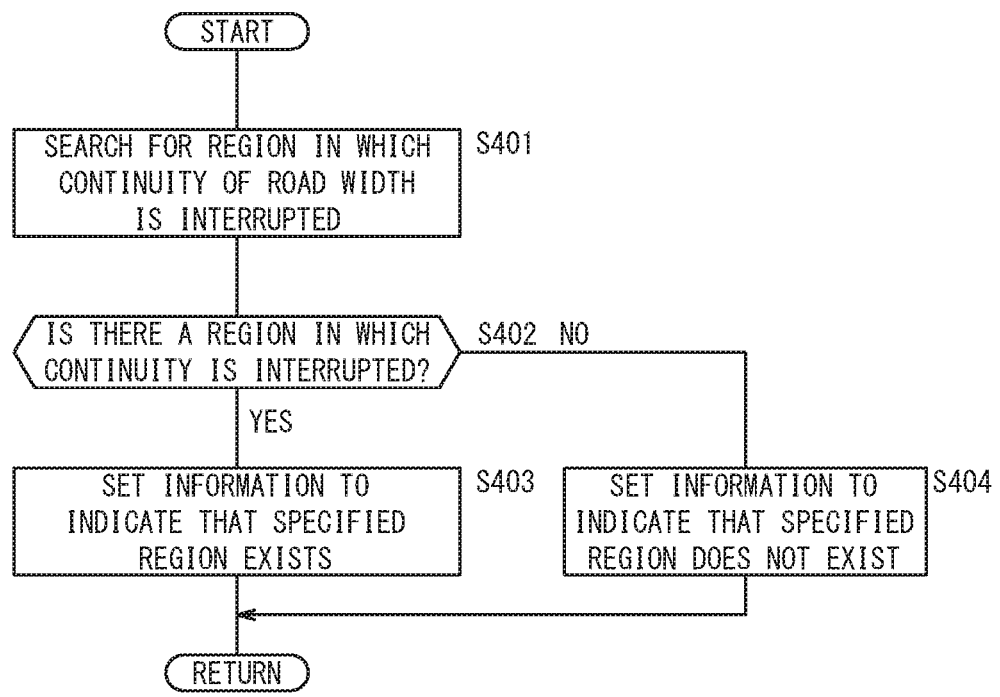
FIG. 11 is a flowchart showing processing operations of a fourth specified region determining unit.

Next, in the case that the fourth specified region determining unit 66D is adopted as the specified region determining unit 66, the process proceeds to step S401 of FIG. 11. In step S401, searching is carried out as to whether or not a region (specified region 70, refer to FIG. 5) exists within the image data in which continuity of the road width of the host vehicle lane 104 with respect to the depth direction is interrupted.

If as a result of the search, a region exists in the host vehicle lane 104 in which continuity of the road width with respect to the depth direction is interrupted (step S402: YES), the process proceeds to step S403, and information is set to indicate that the specified region 70 exists. Such settings may include, for example, setting a determination flag to "1", and setting coordinates of the aforementioned region (for example, the aforementioned region in the image memory) in which continuity of the road width with respect to the depth direction is interrupted within the image data, and the like. Setting of information concerning the aforementioned region in which continuity of the road width with respect to the depth direction is interrupted may include outputting the information concerning the aforementioned region to the lane marking recognition unit 68, or storing the information concerning the aforementioned region in a predetermined memory area, or the like.

On the other hand, in the case it is determined in the aforementioned step S402 that a region in which continuity of the road width with respect to the depth direction does not exist (step S402: NO), the process proceeds to step S404, and information is set to indicate that the specified region 70 does not exist. Such settings may include, for example, resetting the determination flag to "0", or the like.

At a stage at which the process of step S403 or the process of step S404 is completed, the processing performed by the fourth specified region determining unit 66D is temporarily terminated.

Figure 12:
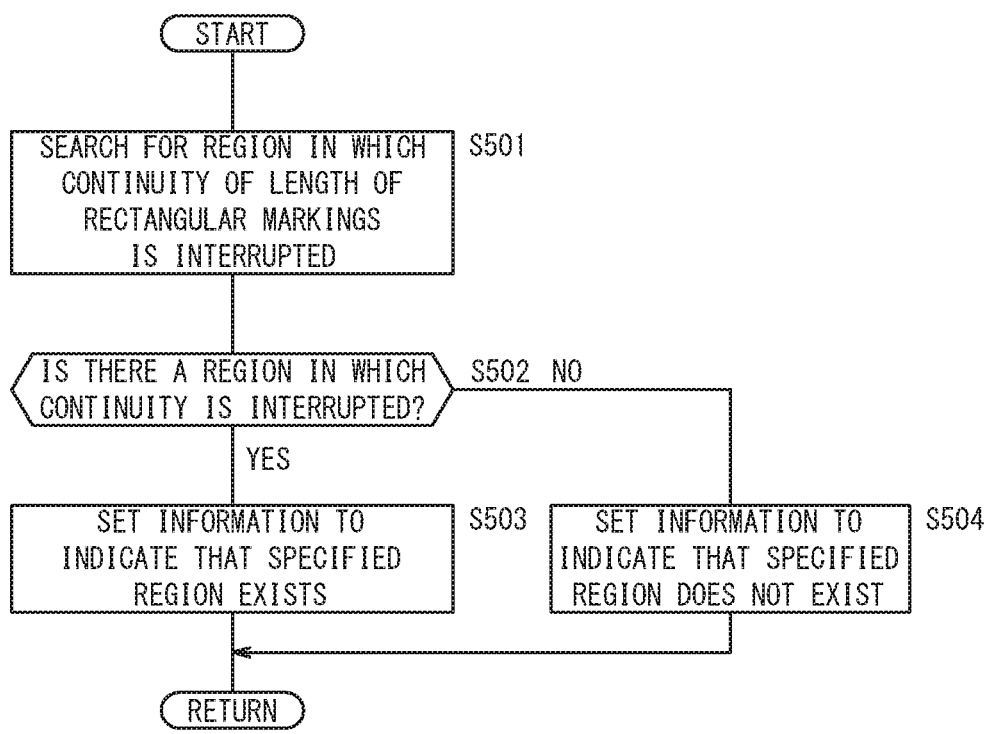
FIG. 12 is a flowchart showing processing operations of a fifth specified region determining unit.
Figure 13B:
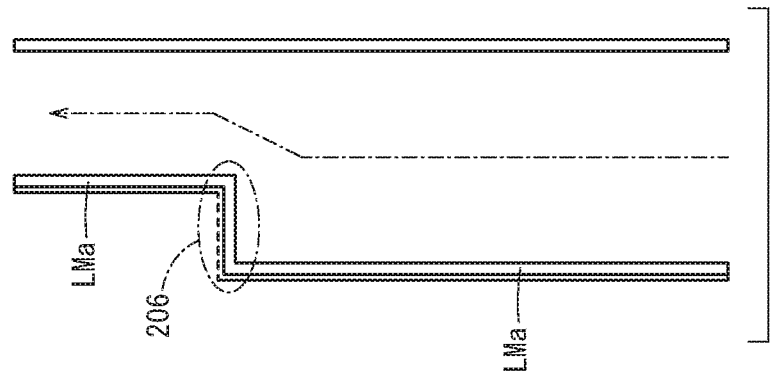
FIG. 13B is a diagram for describing a conventional problem.
Figure 13A:
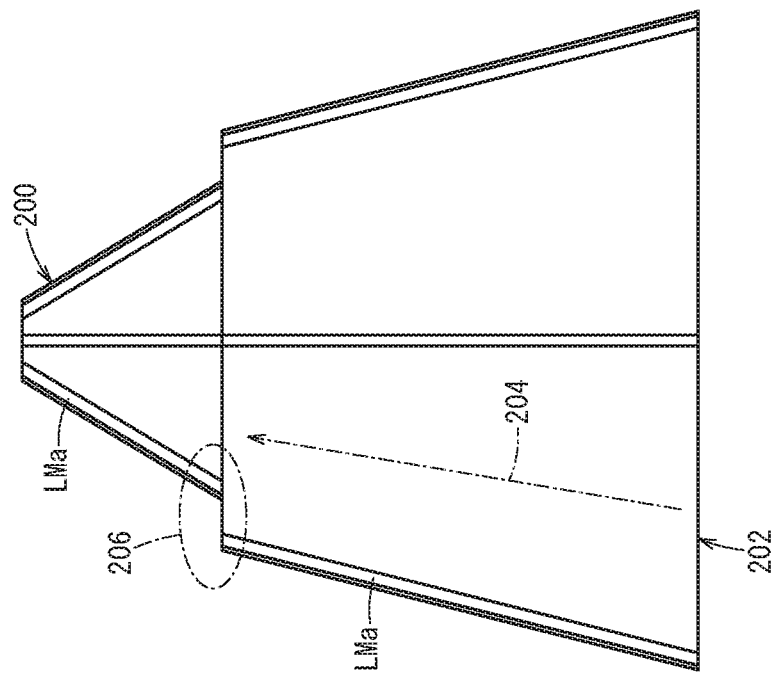
FIG. 13A is an explanatory diagram showing an example of a state in which, within image data, a discontinuous portion is generated in relation to a lane marking on an outer side of a travel lane.

Next, in the case that the fifth specified region determining unit 66E is adopted as the specified region determining unit 66, the process proceeds to step S501 of FIG. 12. In step S501, searching is carried out as to whether or not a region (specified region 70, refer to FIG. 6) exists within the image data, in which, in the dashed-line shaped lane marking LMm of the host vehicle lane 104, continuity of the length of the rectangular markings 114 with respect to the depth direction is interrupted.

If as a result of the search, a region exists in the host vehicle lane 104 in which continuity of the length of the rectangular markings 114 with respect to the depth direction is interrupted (step S502: YES), the process proceeds to step S503, and information is set to indicate that the specified region 70 exists. Such settings may include, for example, setting a determination flag to "1", and setting coordinates of the aforementioned region (for example, the aforementioned region in the image memory) in which continuity of the length of the rectangular markings 114 with respect to the depth direction is interrupted within the image data, and the like. Setting of information concerning the aforementioned region in which continuity of the length of the rectangular markings 114 with respect to the depth direction is interrupted may include outputting the information concerning the aforementioned region to the lane marking recognition unit 68, or storing the information concerning the aforementioned region in a predetermined memory area, or the like.

On the other hand, in the case it is determined in the aforementioned step S502 that a region in which continuity of the length of the rectangular markings 114 with respect to the depth direction does not exist (step S502: NO), the process proceeds to step S504, and information is set to indicate that the specified region 70 does not exist. Such settings may include, for example, resetting the determination flag to "0", or the like.

At a stage at which the process of step S503 or the process of step S504 is completed, the processing performed by the fifth specified region determining unit 66E is temporarily terminated.

In addition, as shown in FIG. 7, at a stage at which processing in the specified region determining unit 66 is completed, the process proceeds to the following step S3, whereupon the lane marking recognition unit 68 determines whether or not the specified region 70 exists. Such a determination is made on the basis of whether or not information indicating that the specified region 70 exists has been set by the specified region determining unit 66.

If information indicating that the specified region 70 exists is set (step S3: YES), the process proceeds to step S4, whereupon the lane marking recognition unit 68 searches for and recognizes the lane marking LM on a side closer to the host vehicle than the specified region 70 which was determined by the specified region determining unit 66. Conversely, if information indicating that the specified region 70 does not exist is set by the specified region determining unit 66 (step S3: NO), the process proceeds to step S5, whereupon the lane marking recognition unit 68 searches for and recognizes the lane marking LM within a preset region. Thereafter, following the elapse of a fixed time period, the process returns to step S1.

In the foregoing manner, the vehicle control device 10 according to the present embodiment is a vehicle control device in which a travel control for the host vehicle 100 is carried out at least partially automatically, including the peripheral image acquisition unit 64 which acquires peripheral image data including the lane marking LM on the road 102 in a travel direction of the host vehicle 100, the lane marking recognition unit 68 which recognizes the lane marking LM from the image data, and the specified region determining unit 66 which determines, within the image data, the presence or absence of the specified region 70 where continuity of the road 102 is interrupted, wherein, in the case that the specified region 70 exists, the lane marking recognition unit 68 performs recognition of the lane marking LM on a side closer to the host vehicle than the specified region 70.

For example, for a case in which the shape of the road 102 is a repetition of uphill and downhill slopes, then when the road 102 is captured by a camera, an image is rendered in which continuity of the road 102 is interrupted. In this case, although it may be considered to mechanically connect the portions where the continuity of the road 102 is interrupted, there is a concern that lane mark searching will be implemented with respect to a shape that differs from the actual road shape, for example, a curving or a crank-shaped road. Thus, according to the present embodiment, recognition of the lane marking LM (lane mark searching) is carried out on a side closer to the host vehicle than the region (the specified region 70) in which continuity of the road 102 is interrupted, and therefore, even if the continuity of the lane marking LM within the image data is interrupted, it is possible to perform lane mark searching without erroneously recognizing the actual shape of the road. This leads to an enhancement in the merchantability of vehicles that carry out a travel control for the vehicle at least partially automatically.

In the present embodiment, the specified region determining unit 66 determines as the specified region 70 a region within the image data in which a line indicating interruption of continuity of the road 102 extends from the host vehicle lane 104 to the oncoming lane 110.

For example, in the case that the shape of the road 102 is a repetition of uphill and downhill slopes, continuity of the road 102 is interrupted not only for the host vehicle lane 104, but also for the oncoming lane 110. Accordingly, within the image data, as the specified region 70, a region is determined in which the boundary line 108 indicating interruption of continuity of the road 102 extends from the host vehicle lane 104 to the oncoming lane 110. Consequently, it is possible to easily and swiftly determine which region is the specified region 70.

In the present embodiment, the specified region determining unit 66 determines as the specified region 70 a region within the image data in which the lane marking LM of the host vehicle lane 104 is shifted in a lateral direction midway therealong.

For example, in the case that the shape of the road 102 is a repetition of uphill and downhill slopes, the lane marking LM of the host vehicle lane 104 becomes shifted in a lateral direction midway therealong at the portion where the continuity of the road 102 is interrupted. Accordingly, within the image data, by determining as the specified region 70 a region in which the lane marking LM of the host vehicle lane 104 is shifted in a lateral direction midway therealong, it is possible to easily and swiftly determine which region is the specified region 70.

In the present embodiment, the specified region determining unit 66 determines as the specified region 70 a region within the image data in which the lane marking LM of the host vehicle lane 104, and the lane marking LM of the oncoming lane 110 are both shifted in a lateral direction midway therealong.

For example, in the case that the shape of the road 102 is a repetition of uphill and downhill slopes, the lane marking LM of the oncoming lane 110 also becomes shifted in a lateral direction midway therealong at the portion where the continuity of the road 102 is interrupted. Accordingly, within the image data, by determining as the specified region 70 a region in which the lane marking LM of the host vehicle lane 104, and the lane marking LM of the oncoming lane 110 are both shifted in the lateral direction midway therealong, it is possible to easily, swiftly and reliably determine which region is the specified region 70.

In the present embodiment, the specified region determining unit 66 determines as the specified region 70 a region within the image data in which continuity of the road width of the host vehicle lane 104 with respect to the depth direction is interrupted.

For example, in the case that the shape of the road 102 is a repetition of uphill and downhill slopes, the continuity of the road width with respect to the depth direction of the host vehicle lane 104 becomes interrupted at the portion where the continuity of the road 102 is interrupted. Accordingly, within the image data, by determining as the specified region 70 a region in which continuity of the road width of the host vehicle lane 104 with respect to the depth direction is interrupted, it is possible to easily and swiftly determine which region is the specified region 70.

In the present embodiment, within the image data, in the case that the plurality of rectangular markings 114 that make up the dashed-line shaped lane marking LMm are included in the host vehicle lane 104, the specified region determining unit 66 determines as the specified region 70 a region in which continuity of the length of the plurality of rectangular markings 114 with respect to the depth direction is interrupted.

On the road 102, as the lane markings LM, there exist the continuous band shaped lane marking LM (white line), as well as the dashed-line shaped lane marking LMm. To make up the dashed-line shaped lane marking LMm, a plurality of rectangular markings 114 are drawn along the road 102.

In addition, in the case that the shape of the road 102 is a repetition of uphill and downhill slopes, the continuity of the length of the plurality of rectangular markings 114 with respect to the depth direction becomes interrupted at the portion where the continuity of the road 102 is interrupted. Accordingly, within the image data, by determining as the specified region 70 a region in which continuity of the length with respect to the depth direction of the plurality of rectangular markings 114 is interrupted, it is possible to easily and swiftly determine which region is the specified region 70.

The present invention is also applicable to a case in which the vehicle travels on the right side of the road (i.e., right-hand traffic).

The present invention is not limited to the embodiments described above, and it goes without saying that the present invention can be freely modified within a range that does not depart from the scope of the present invention.

What is claimed is:
1. A vehicle control device configured to carry out a travel control for a host vehicle at least partially automatically, comprising:
    a processing unit that executes programs stored in a storage device, the processing unit comprising:

a peripheral image acquisition unit configured to acquire peripheral image data including a lane marking on a road in a travel direction of the host vehicle;

a lane marking recognition unit configured to recognize the lane marking from the image data; and a specified region determining unit configured to determine, within the image data, presence or absence of a specified region where continuity of the road is interrupted due to a shape of the road including a closer uphill slope, a downhill slope, and a farther uphill slope, the farther uphill slope being great enough to be acquired by the peripheral image acquisition unit;

wherein, in a case that the specified region exists, the lane marking recognition unit performs recognition of the lane marking on a side closer to the host vehicle than the specified region, the specified region determining unit determines as the specified region a region within the image data in which the lane marking of a travel lane of the host vehicle is shifted inward in a lateral direction midway therealong, due to the downhill slope.

2. The vehicle control device according to claim 1, wherein the specified region determining unit determines as the specified region a region within the image data in which a line indicating interruption of continuity of the road extends from a travel lane of the host vehicle to a lane in which an oncoming vehicle travels.

3. The vehicle control device according to claim 1, wherein the specified region determining unit determines as the specified region a region within the image data in which the lane marking of the travel lane of the host vehicle, and the lane marking of a lane in which an oncoming vehicle travels are both shifted in a lateral direction midway therealong.

4. The vehicle control device according to claim 1, wherein the specified region determining unit determines as the specified region a region within the image data in which continuity of a road width of a travel lane of the host vehicle with respect to a travel direction is interrupted.

5. The vehicle control device according to claim 1, wherein:

within the image data, a plurality of rectangular markings that make up a dashed-line shaped lane marking are included in a travel lane of the host vehicle; and the specified region determining unit determines as the specified region a region in which continuity of a length of the plurality of rectangular markings with respect to the travel direction is interrupted.

6. The vehicle control device according to claim 1, wherein a region on a side closer to the host vehicle than the specified region is a region from 100 to 300 meters away from the host vehicle.

7. The vehicle control device according to claim 1, wherein, in a case that the specified region does not exist, the lane marking recognition unit performs recognition of the lane marking within a preset region.

8. The vehicle control device according to claim 7, wherein the preset region is a region from 300 to 500 meters away from the host vehicle.

* * * * *